United States Patent
Heitz et al.

(10) Patent No.: US 6,285,939 B1
(45) Date of Patent: Sep. 4, 2001

(54) POWER TRAIN CONTROL SYSTEM

(75) Inventors: Uwe Heitz, Friedrichshafen; Siegfried Dobler, Langenargen; Arun-Kuma Chatterjee, Friedrichshafen, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/509,155

(22) PCT Filed: Oct. 1, 1998

(86) PCT No.: PCT/EP98/06257

§ 371 Date: Mar. 22, 2000

§ 102(e) Date: Mar. 22, 2000

(87) PCT Pub. No.: WO99/17950

PCT Pub. Date: Apr. 15, 1999

(30) Foreign Application Priority Data

Oct. 7, 1997 (DE) ............................................. 197 44 218

(51) Int. Cl.[7] .................................................... B60K 41/08
(52) U.S. Cl. ................... 701/51; 60/395; 60/445; 74/745; 74/866; 74/867; 74/860
(58) Field of Search ................... 701/51, 87, 55; 74/473.1; 91/473; 440/84

(56) References Cited

U.S. PATENT DOCUMENTS

| 4,648,040 | 3/1987 | Cornell et al. ........................... 701/3 |
| 4,735,114 | 4/1988 | Satoh et al. ............................. 74/866 |
| 4,866,622 | 9/1989 | Dreher et al. ......................... 701/102 |

FOREIGN PATENT DOCUMENTS

| 42 23 967 A | 1/1994 | (DE) . |
| 196 31 070 A | 2/1998 | (DE) . |
| 0 415 048 A | 3/1991 | (EP) . |
| 0 698 518 A | 2/1996 | (EP) . |
| 85/05333 | 12/1985 | (WO) . |
| 93/21031 A | 10/1993 | (WO) . |

OTHER PUBLICATIONS

Jaufmann, A.: "Entwicklung und Aufbau eines Traktormanagementsystems", *O+P ölydraulik und Pneumatik*, vol. 41, No. 4, 1997, pp 234–241.

*Primary Examiner*—William A. Cuchlinski, Jr.
*Assistant Examiner*—Tuan C To
(74) *Attorney, Agent, or Firm*—Davis & Bujold, P.L.L.C.

(57) ABSTRACT

A power train control (1) for a vehicle (8) or an automotive machine with a prime mover (5) with a governor (2) and a continuously variable transmission (7) with a ratio control (3). The power train control (1) coordinates the ratio control and the governor issuing a theoretical speed $n\_mot\_nom$ to the governor (2) for the prime mover (5) and a nominal transmission ratio $i\_nom$ to the ratio control (3). The power train control (1) is designed as a combination of two governors, the transmission output speed governor (9) and the governor (10) for relief of the prime mover (5). The transmission output speed governor (9) receives the transmission output speed $n\_out$ as a control variable and generates the nominal speed $n\_mot\_nom$ for the prime mover (5) as a manipulated value, and the governor (10) for relief of the prime mover (5) by the speed $n\_mot$ of the prime mover (5) as a control value and a transmission ratio correction value $\Delta i$ as a manipulated value. The nominal transmission ratio $i\_nom$ is specified by addition of this correction value $\Delta i$ to a coarse transmission nominal ratio $i\_0\_nom$, with the latter being specified as function of the nominal speed $n\_mot\_nom$ of the prime mover (5) and the nominal transmission output speed $n\_out\_nom$ set by the driver (4).

19 Claims, 6 Drawing Sheets

POWER TRAIN CONTROL SYSTEM

BACKGROUND OF THE INVENTION

The invention refers to a power train control for overall control of a prime mover and a transmission for a vehicle or an automotive machine with a prime mover with speed control and a continuously variable transmission with ratio control.

SUMMARY OF THE INVENTION

A power train control for a tractor management system is outlined in an article by *A. Jaufmann, O+P Ölhydraulik und Pneumatik*41 (1997) Nr. 4, 234–241. Details regarding control and regulation strategies or algorithms for the management of the complete system made up of prime mover and transmission, however, are not dealt with.

The objective of the invention is to come up with a power train control which controls a power train including the components prime mover with speed governor and CVT with ratio control in such a way that minimum energy is consumed, but the performance/traction required is available when needed. The transitions between the set combinations of speed of prime mover and gear ratio are to be effected promptly and in a stable manner.

This task is solved by means of a generic power train control which is also provided with the characteristic features of the main claim.

Specific versions of the invention are detailed in the sub-claims.

BRIEF DESCRIPTION OF THE DRAWINGS

An example of a version of the invention is detailed in the following with the aid of schematics and functional diagrams.

DESCRIPTION OF THE PREFERRED EMBODIMENTS

Figure 1:
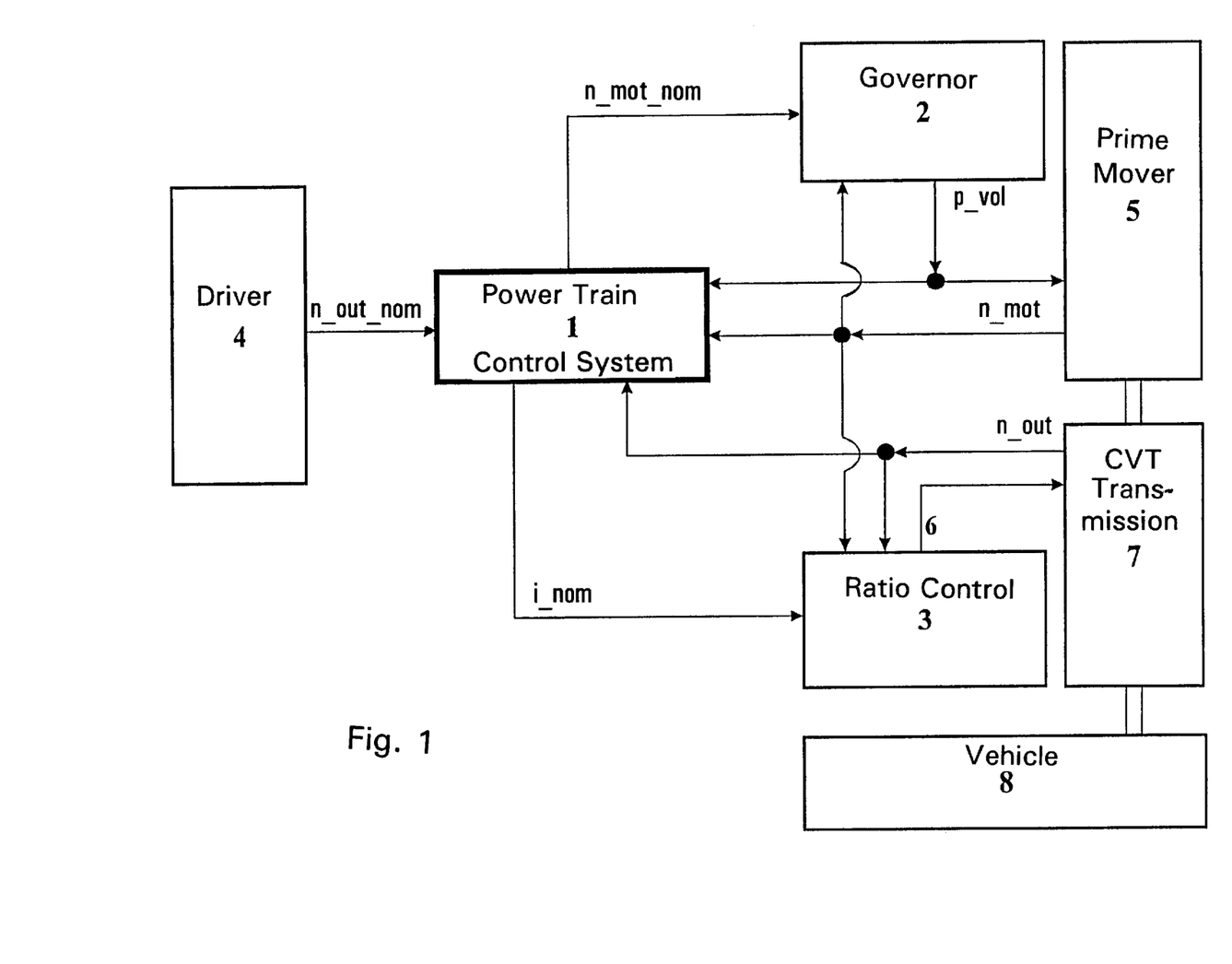
FIG. 1 Block diagram showing the integration of the power train control system into the overall vehicle system.

The power train control system 1 is a higher-order software unit supplying nominal values to the lower-order control loops governor 2 of the prime mover 5 and ratio control 3 of the continuously variable transmission 7 (FIG. 1). It supplies a nominal speed n_mot_nom to the governor 2 of the prime mover 5 and a nominal transmission ratio i_nom to the ratio control 3. To avoid division by zero, a nominal value for reciprocal transmission may be used instead of the transmission ratio nominal value i_nom. All following calculations are performed as analog computations with the reciprocal transmission ratio i_rec and its derived analog operands instead of with the transmission ratio i and all its derived operands. The reciprocal transmission ratio i_rec=n_output/n_input is preferred especially for continuously variable power-splitting transmissions, since with this type of transmission the output speed zero may be set for certain transmission settings and a finite input speed, as a result of the two power-split ranges being summarized in a summarizing transmission. This zero setting (zero division), i. e. an infinite transmission ratio, is avoided with the use of the reciprocal transmission ratio.

To compute these nominal values, the power train control system 1 processes at least the following input parameters:

The nominal transmission output speed n_outnom, which is proportional to the nominal road speed set by the driver 4. The (actual)transmission output speed n_out. The (actual) speed n_mot of the prime mover 5. The load signal p_vol of the governor 2 of the prime mover 5.

The governor 2 of the prime mover 5 supplies the latter with the signal for the injection volume or load p_vol, for the desired speed of the prime mover 5 to be maintained as far as possible. The ratio control 3 supplies the transmission 7 with various transmission-specific control signals 6, for the desired transmission connection to be established between prime mover 5 and vehicle 8.

The power train control system 1 (FIG. 2) is designed to supply the prime mover 5 with the performance required for the nominal drive speed at minimum engine speed. With regard to efficiency, this is very favorable, because in this manner the power train is operated at a near-optimum degree of efficiency. The power train control system 1 is realized as a combination of two governors, the transmission output speed governor 9 and the governor 10 for the relief of the prime mover 5. The regulating mechanisms of the two governors operate simultaneously and supplement each other. The transmission output speed governor 9 is characterized by the transmission output speed n_out as a controlled variable and by the nominal speed n_mot_nom of the prime mover 5 as a manipulated variable. The controlled variable of the governor 10 for the relief of the prime mover 5 is the speed n_mot of the prime mover 5. Its manipulated variable is an offset value Δi for the coarse transmission nominal ratio i_0_nom, which is preset in a processing unit 11 on the basis of nominal drive speed and nominal speed n_mot_nom of the prime mover 5.

Figure 2:
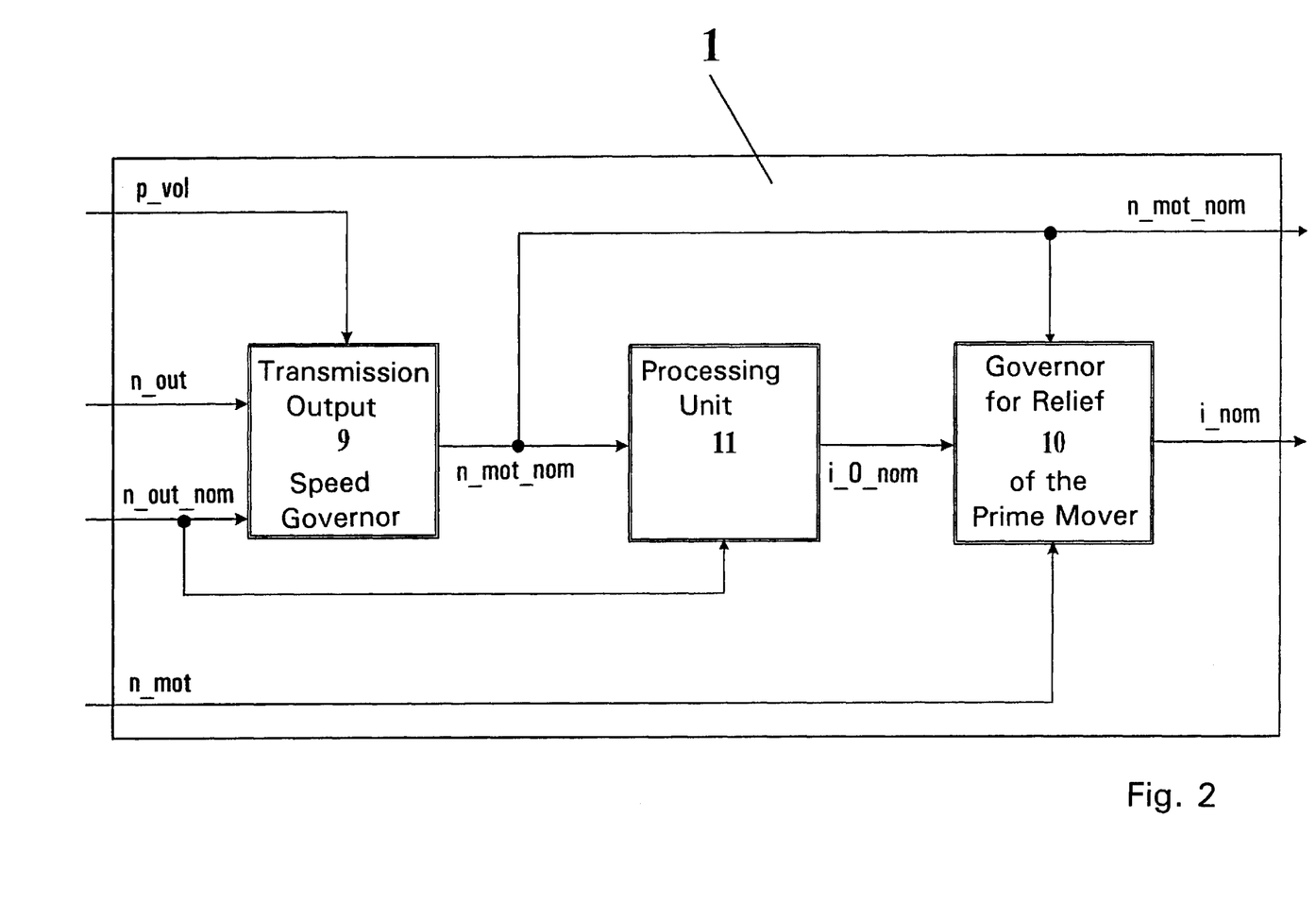
FIG. 2 Schematic of the power train control system with transmission output speed governor and the governor for prime mover relief.

The performance requested is determined by the transmission output speed governor 9 by comparing nominal and actual output speeds (FIG. 2). Additional correction of the manipulated value n_mot_nom is provided by the influence of the load signal p_vol of the governor 2 of the prime mover 5. Initially, the transmission output speed governor 9 provides a low nominal speed n_mot_nom for the prime mover 5. For low performance requirements, the specified nominal transmission output speed n_out_nom can be maintained.

Transmission output speed n_out will decrease with increasing performance requirements. The transmission output speed governor 9 will then increase the nominal speed n_mot_nom of the prime mover 5 until, due to the raised input performance, the transmission output speed n_out has returned to its nominal value nout_nom.

In the processing unit 11, the provisional coarse transmission nominal ratio i_0_nom is computed from the nominal speed n_mot_nom of the prime mover 5 on the basis of the equation i_0_nom=n_mot_nom/n_out_nom. This provisional value i_0_nom is input value for the governor 10 for relief of the prime mover 5, where it is corrected and becomes the final nominal transmission ratio i_nom. Correction is determined by the deviation of the actual speed of the prime mover 5 from its nominal speed (n_mot_nom−n_mot), the so-called prime mover 5 depression. With prime mover 5 depression(n_mot<n_mot_nom), the ratio is corrected to a lower ratio, i. e. to higher nominal ratio figures i_nom. When the prime mover 5 is raced (n_mot>n_mot_nom), the ratio is corrected to a higher ratio, i. e. to lower nominal ratio figures i_nom. This correction is necessary because of the highly dynamic coarse transmission nominal ratio i_0_nom. For this nominal value is computed on the basis of the nominal transmission output speed n_out_nom, which is directly specified by the speed set by the driver 4. The driver 4, however, can instantaneously change his specified speed, which will immediately change the nominal ratio. Rapid changes toward high ratios will result in the transmission 7 bringing high drag forces to bear on the prime mover 5. Due to inertia, the vehicle 8 will more or less maintain its speed, while the ratio change will almost exclusively find its expression in a depression of the speed of the prime mover 5. The governor 2 of the prime mover 5 is not capable of maintaining the speed n_mot_nom at the prime mover 5 as specified by the power train control system 1. Depending on the speed load, the prime mover 5 might even be stalled. By analogy, a rapid change (re-setting) to low ratios may have a strong propelling effect on the prime mover 5. The governor 10 for the relief of the prime mover 5 uses the course transmission nominal ratio i_0_nom to calculate the corrected value i_nom, which is passed on to the ratio control 3 of the transmission 7. On the basis of the corrected ratio, the governor 2 of the prime mover 5 is in a position to more or less maintain the nominal speed n_mot_nom on the prime mover 5 as specified by the power train control system 1. Correction of i_0_nom consequently relieves the prime mover 5. Therefore, this governor 10 has been termed "governor for the relief of the prime mover".

Figure 3:
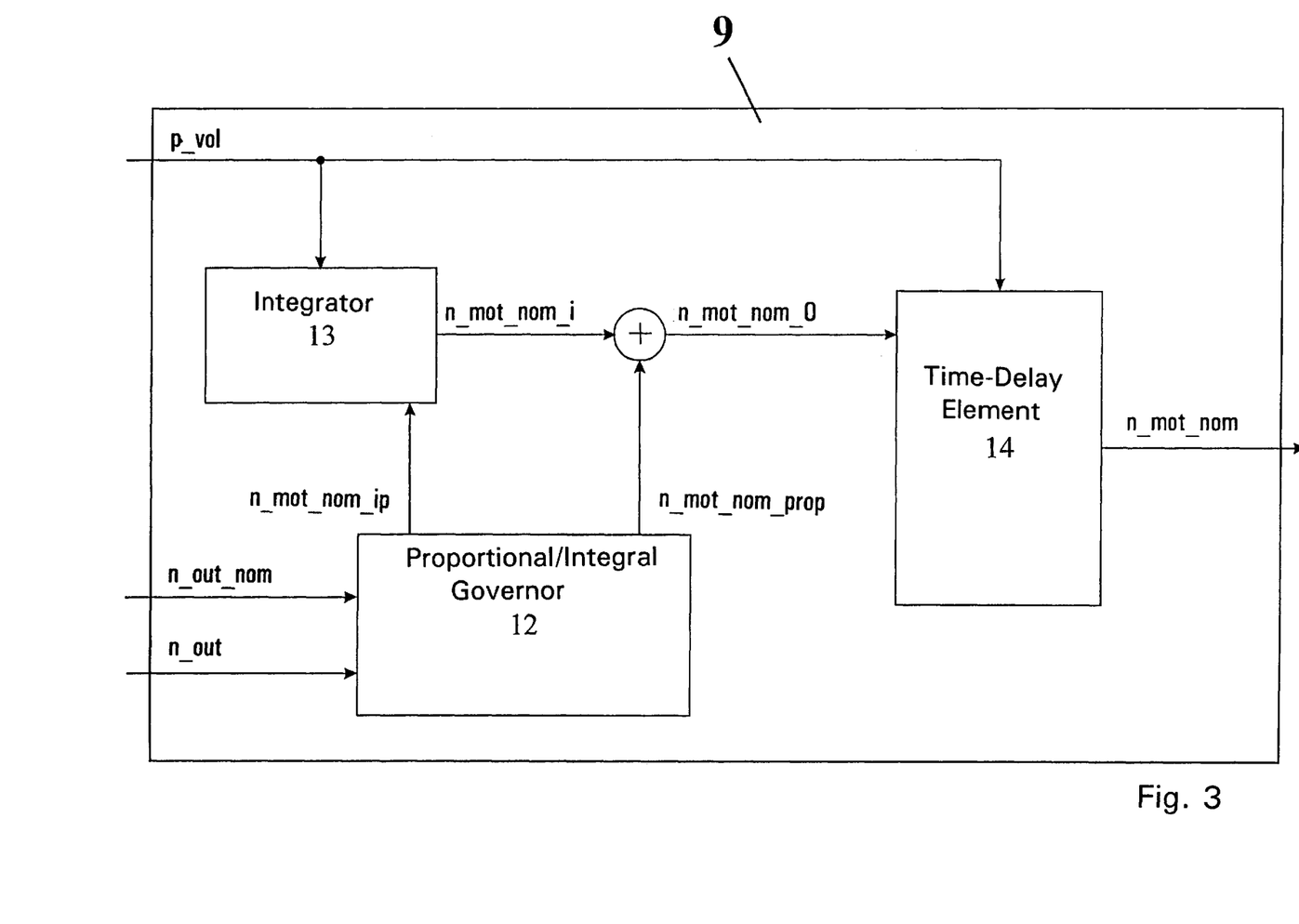
FIG. 3 Schematic of the transmission output speed governor.
Figure 4:
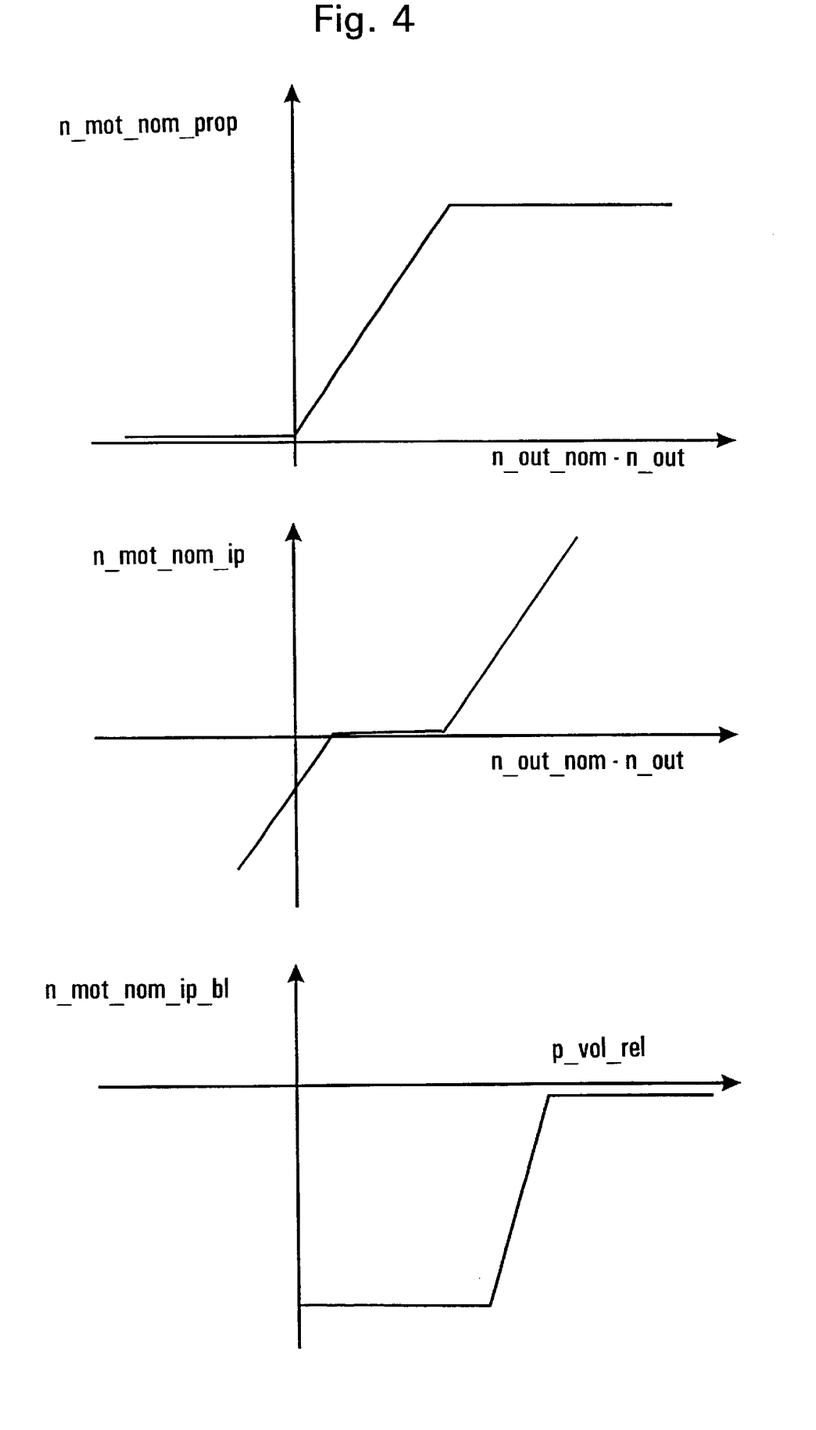
FIG. 4 Characteristics of operands of the transmission output speed governor for determination of its manipulated variable, the nominal speed n_mot_nom of the prime mover.

A detailed description of the transmission output speed governor 9 follows:

The transmission output speed governor 9 is essentially a proportional/integral governor 12 (FIG. 3). Proportional and integral shares of the manipulated value n_mot_nom each possess a non-linear dependence on the system deviation n_out_nom−n_out. Moreover, both the integral share and the overall manipulated value possess a rate-of-change limiter (hill-climbing controller) and an absolute-value limiter. The proportional share n_mot_nomprop of the manipulated value n_mot_nom as well as the temporal derivative of its integral share n_mot_nomip are each determined by means of characteristics depending on the system deviation n_out_nom−n_out (FIG. 4). In an integrator 13, the temporal derivative n_mot_nom_ip of the integral share n_mot_nom_i of the manipulated value n_mot_nom is integrated into an absolute integral share n_mot_nom_i, with the following limiters being operative: Integration is discontinued when the integral share n_mot_nom_i has reached a value of n_mot_nom_i_b1 for a bottom limit or a value n_mot_nom_i_u1 for an upper limit. This means, n_mot_nom_i_b1≦n_mot_nom_i≦n_mot_nom_i_u1 always applies.

Moreover, the temporal derivative n_mot_nom_ip of the integral share n_mot_nom_i of the manipulated value n_mot_nom is limited by a minimum value n_mot_nom_ip_b1. The minimum value n_mot_nom_ip_b1 is specified for the prime mover 5 as characteristics depending on the relative load p_vol_rel (FIG. 4). The relative load p_vol_rel is the quotient resulting from the division of the load signal pvol by the speed-dependent full load p_vol_max of the prime mover 5: p_vol_rel=p_vol/p_vol_max.

The values of p_vol_max as functions of the engine speed n_mot are tuning parameters in relation to the prime mover 5.

As a result of rate-of-change limitation, n_mot_nom_ip_b1 ≦n_mot_nom_ip is always maintained.

The two governor shares n_mot_nom_i and n_mot_nom_prop are added up resulting in a specification value n_mot_nom_0 for the speed n_mot_nom of the prime mover 5. This summarized value n_mot_nom_0 is filtered by a time-delay element 14 (PT1-element) with rate-of-change and absolute-value limiters. The limiters ensure that the following conditions are always maintained for the final manipulated value n_mot_nom of the transmission output speed governor 9 as well as for their temporal derivatives:

n_mot_min≦n_mot_nom≦n_mot_max and n_mot_nom_p_min≦n_mot_nom_p <n_mot_nom_p_max with n_mot_min being a specified min. value of the nom. speed n_mot_nom of the prime mover 5 and n_mot_max being a specified max. value of the nom. speed n_mot_nom of the prime mover 5 and with n_mot_nom_p_min being a specified min. value of the temporal derivative n_mot_nom_p of the nominal speed n_mot_nom of the prime mover 5 and n_mot_nom_p_max being a specified max. value of the temporal derivative n_mot_nom_p of the nominal speed of the prime mover 5.

As a rule, the specified min. value n_mot nom_p_min of the temporal derivative n_mot_nom_p of the nominal speed of the prime mover 5 is already specified by the limit value n_mot_nom_ip_b1 used above for n_mot_nom_ip. As a rule, n_mot_nom _p_max is a fixed limit specified as tuning parameter.

Figure 5:
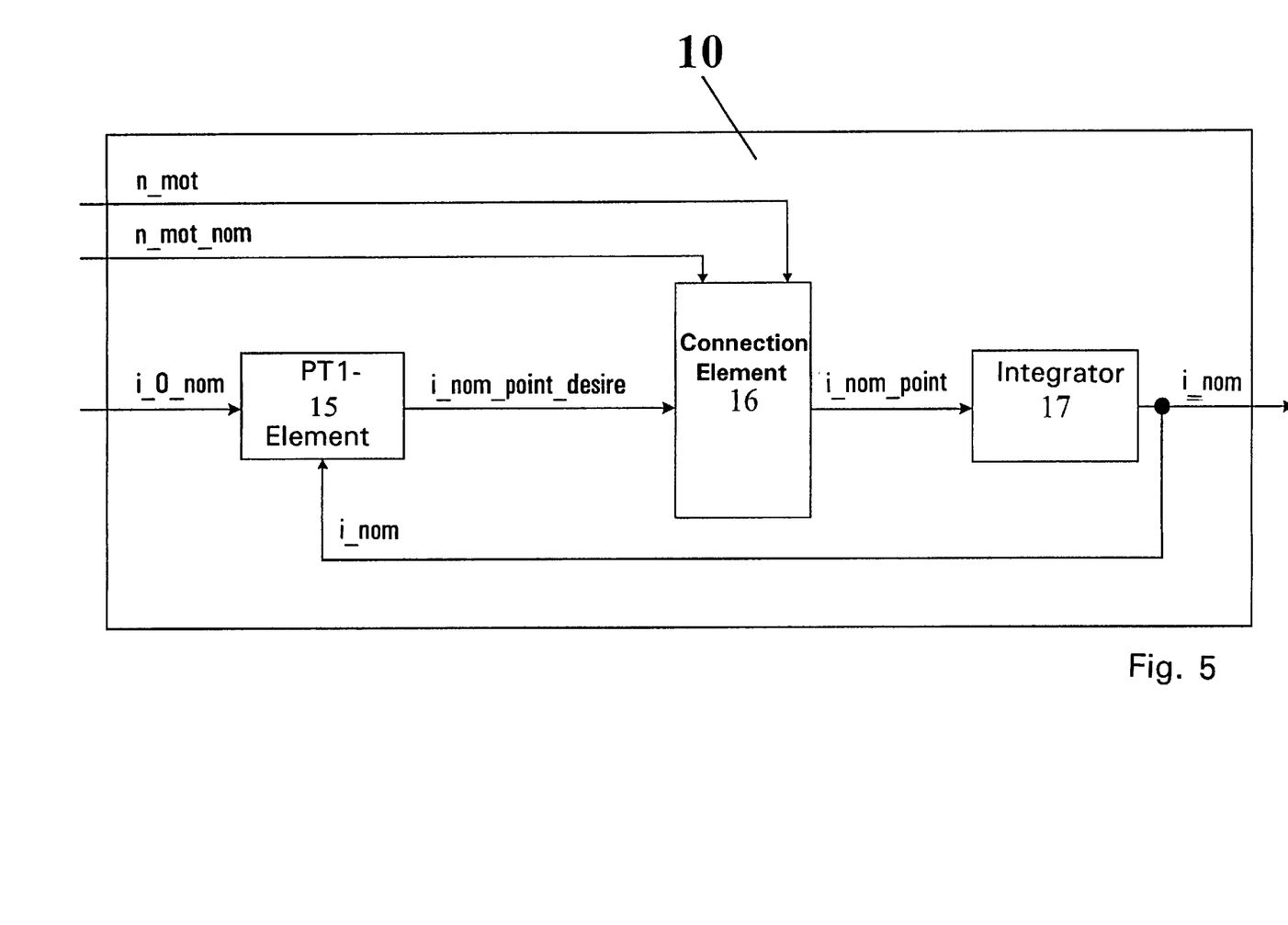
FIG. 5 Schematic of the governor for prime mover relief.

A detailed description of the governor 10 for the relief of the prime mover 5 follows:

As mentioned above, correction of the coarse transmission nominal ratio i_0_nom by the governor 10 for the relief of the prime mover 5 to the output value i_nom for the ratio control 3 of the transmission 7 is effected mainly for dynamical reasons. The most important task of the governor 10 for the relief of the prime mover 5 is correction of the re-setting speed d/dt(i_0_nom) of the coarse transmission nominal ratio i_0_nom. Therefore, correction of the coarse transmission nominal ratio i_0_nom is carried out only on gradients (FIG. 5). Gradient calculation by a PT1-element 15 determines a non-corrected setting speed i_nom_point_desire:

i_nom_point_desire=(1/τ_i_nom_desire)*(i_0_nom−i_nom), with the time constant τ_i_nom_desire being a tuning parameter. This means, i_nom_point_desire follows, smoothened by the PT-1 filter, the dynamics with which the transmission output speed governor 9 specifies the nominal speed n_mot_nom for the prime mover 5. i_nom_point_desire is limited by the tuning parameters i_nom_point_desire_min and i_nom_point_desire_max:

i_nom_point_desire_min≦i_nom_point_desire≦i_nom_point_desire_max.

Figure 6:
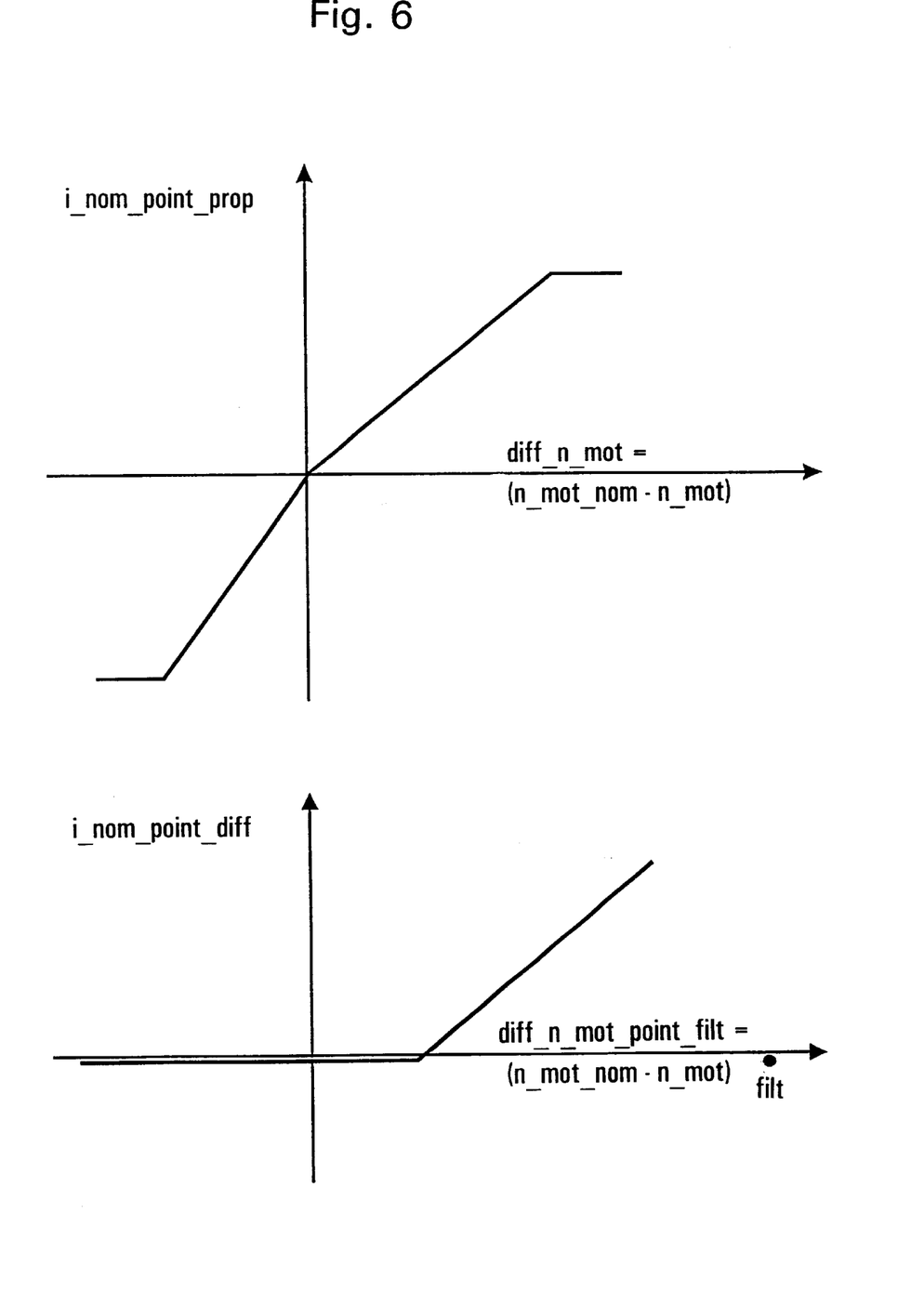
FIG. 6 Characteristics of operands of the governor for prime mover relief for determination of its manipulated variable, the nominal transmission ratio i_nom.

The actually effective setting speed i_nom_point results in a correction element 16 from the summing-up of i_nom_point_desire with the two correction terms i_nom_point_prop and i_nom_point_diff:

i_nom_point=i_nom_point_desire+i_nom_point_prop+i_nom_point_diff.

i_nom_point_prop and i_nom_point_diff represent the proportional and differential shares of the governor 10 for the relief of the prime mover 5 and are specified by characteristics (FIG. 6) depending on the system deviation diff_n_mot=n_mot_nom−n_mot and/or their filtered temporal derivative diff_n_mot_point_filt=filter function (d/dt(n_mot_nom−n_mot).

Integration of the summarized value i_nom_point in an integrator 17 finally results in the final nominal value i_nom, supplied by the power train control system 1 to the ratio control 3 of the continuously variable transmission.

As a rule, the correction term does not alter the setting direction of the transmission ratio. Only the setting speed is reduced, i. e. i_nom approaches i_0_nom at a slower rate when the prime mover 5 is depressed or raced. In an extreme situation, however, such as a sudden change to a very high drive drag, the correction term may overcompensate the non-corrected setting speed i_nom_point_desire. This means that setting is effected not only at a slower rate to low ratios i, but explicitly to high ratios i.

As mentioned above, all calculations can be analog computations with the reciprocal transmission ratio i_rec and its analog derivatives instead of with the transmission ratio i and all its derivatives. Of coarse, the derived parameters are to be newly determined and mathematically correct.

References 1 power train control
2 governor (of the prime mover)
3 ratio control
4 driver
5 prime mover
6 control signals
7 transmission
8 vehicle
9 transmission output speed governor
10 governor (for relief of the prime mover)
11 processing unit
12 proportional/integral governor
13 integrator
14 time-delay element
15 pt1-element
16 correction element
17 integrator

What is claimed is:

1. A power train control system connected to a prime mover (5), controlled by a prime mover governor (2), with the prime mover being connected to a continuously variable transmission (7) which is controlled by a ratio control (3), the power train control system comprising:

a combination of a transmission output speed governor (9) and a governor (10) for relief of the prime mover, and the power train control system (1) comprising means for issuing a theoretical prime mover speed n_mot_nom to the prime mover governor (2) and for issuing a theoretical transmission ratio i_nom to the ratio control (3);

the transmission output speed governor (9) receiving, as a control variable input, the transmission output speed n_out, and outputting, as a manipulated variable of the transmission output speed governor (9), the theoretical prime mover speed n_mot_nom;

the governor (10) for relief of the prime mover receiving, as a control variable input, the speed n_mot of the prime mover (5), and outputting, as a manipulated variable of the governor (10) for relief of the prime mover, a transmission ratio correction value Δi, with the theoretical transmission ratio i_nom being calculated by adding the correction value Δi to the initial transmission theoretical value i_0_nom; and the initial transmission theoretical value i_0_nom is determined as a function of the theoretical prime mover speed n_mot_nom of the prime mover (5) and the theoretical transmission output speed n_out_nom.

2. The power train control (1) according to claim 1, wherein the transmission ratio theoretical value i_0_nom is specified by the equation: i_0_nom=n_mot_nom/n_out_nom.

3. The power train control (1) according to claim 1, wherein both the transmission output speed governor (9) and the governor (10) for relief of the prime mover are digital Proportional Integral Derivative (PID) governors.

4. The power train control (1) according to claim 1, wherein the transmission output speed governor (9) is a Proportional Integral (PI) governor and a proportional value n_mot_nom_prop and an integral value n_mot_nom_i of the manipulated variable n_mot_nom each have a non-linear dependence on a system deviation n_out_nom.

5. The power train control (1) according to claim 4, wherein the proportional value n_mot_nom_prop of the manipulated value n_mot_nom as well as a temporal derivative n_mot_nom_ip of the integral value n_mot_nom_i are each determined by means of the characteristics depending on the system deviation n_out_nom−n_out.

6. The power train control (1) according to claim 5, wherein the integral value n_mot_nom_i of the manipulated value n_mot_nom is limited so that the following relationship always applies:

n_mot_nom_i_b1 ≦ n_mot_nom_i ≦ n_mot_nom_i_u1, where n_mot_nom_i_b1 is a bottom limit for the value n_mot_nom_i and n_mot_nom_i_u1 is an upper limit for the value n_mot_nom_i.

7. The power train control (1) according to claim 5, wherein the temporal derivative n_mot_nom_ip of the integral value n_mot_nom_i of the manipulated value n_mot_nom is limited by a minimum value n_mot_nom_ip_b1.

8. The power train control (1) according to claim 7, wherein the minimum value n_mot_nom_ip_b1 is specified by a characteristic curve depending on a relative load p_vol_re1 of the prime mover (5), and the relative load p_vol_re1 is a quotient determined from a load signal p_vol and a speed-dependent full load p_vol_max of the prime mover (5) and the speed-dependent full load p_vol_max is a tuning parameter of the prime mover (5).

9. The power train control (1) according to claim 1, wherein the manipulated value of the transmission output speed governor (9) n_mot_nom is filtered by a time-delay element (14).

10. The power train control (1) according to claim 9, wherein the time-delay element (14) is a PT1-element with rate-of-change and absolute value limiters.

11. The power train control (1) according to claim 1, wherein the manipulated value of the transmission output speed governor (9) n_mot_nom fulfills a relation of:

n_mot_min ≦ n_mot_nom ≦ n_mot_max, where n_mot_min is a specified minimum value of the nominal speed n_mot_nom of the prime mover (5) and n_mot_max is a specified maximum value of the nominal speed n_mot_nom of the prime mover (5).

12. The power train control (1) according to claim 1, wherein a temporal derivative of the manipulated value n_mot_nom_p fulfills a relation of:

n_mot_nom_p_min ≦ n_mot_nom_p ≦ n_mot_nom_p_max, where n_mot_nom_p_min is a specified minimum value of the temporal derivative n_mot_nom_p of the nominal speed n_mot_nom of the prime mover (5) and n_mot_nom_p_max is a specified maximum value of the temporal derivative n_mot_nom_p of the nominal speed of the prime mover (5).

13. The power train control (1) according to claim 12, wherein the specified minimum value n_mot_nom_p_min of the temporal derivative n_mot_nom_p of the nominal speed of the prime mover (5) is set by the value n_mot_nom_ip_bl.

14. The power train control (1) according to claim 1, wherein the governor (10) for relief of the prime mover uses a coarse resetting speed d/dt (i_0_nom) to calculate a corrected resetting speed i_nom_point, and the coarse resetting speed d/dt (i_0_nom) is determined by a temporal derivative of the initial transmission ration theoretical value i_0_nom computed in the processing unit (11) on a basis of the theoretical prime mover speed n_mot_nom from the transmission output speed governor (9) and a theoretical transmission output speed n_out_nom from a driver (4), and integration of the corrected resetting speed in the governor (10) for relief of the prime mover results in the theoretical transmission ratio i_nom.

15. The power train control (1) according to claim 14, wherein the governor (10) for relief of the prime mover contains a proportional/differential governor which sets the corrected resetting speed i_nom_point.

16. The power train control (1) according to claim 15, wherein the resetting speed i_nom_point is specified by the relation of:

i_nom_point=i_nom_point_desire+i_nom_point_prop+i_nom_point_diff, where i_nom_point_desire is a function of i_0_nom and i_nom, and i_nom_point_prop represents a proportional share of the governor (10) for relief of the prime mover and is specified by a characteristic curve depending on the system deviation diff_n_mot=n_mot_nom−n_mot, and i_nom_point_diff represents a differential share of the governor (10) for relief of the prime mover and is specified by a characteristic curve depending on the filtered temporal derivative of the system deviation diff_n_mot_point_filt=filter function (d/dt (n_mot_nom−n_mot).

17. The power train control (1) according to claim 16, wherein i_nom_point_desire is specified by the relation of:

i_nom_point_desire=$(1/\tau\_i\_nom\_desire)*(i\_0\_nom-i\_nom)$, where the time constant $\tau\_i\_nom\_desire$ is a tuning parameter.

18. The power train control (1) according to claim 16, wherein i_nom_point_desire is limited by the relation of:

i_nom_point_desire_min ≦ i_nom_point_desire ≦ i_nom_point_desire_max, where i_nom_point_desire_min and i_nom_point_desire_max are tuning parameters.

19. A power train control system connected to a prime mover (5), controlled by a prime mover governor (2), with the prime mover being connected to a continuously variable transmission (7) which is controlled by a ratio control (3), the power train control system comprising:

a combination of a transmission output speed governor (9) and a governor (10) for relief of the prime mover, and the power train control system (1) comprising means for issuing a theoretical prime mover speed n_mot_nom to the prime mover governor (2) and for issuing a theoretical transmission ratio i_nom to the ratio control (3);

the transmission output speed governor (9) receiving, as a control variable inputs, the transmission output speed n_out, a load signal p_vol and a theoretical transmission output speed n_out_nom and outputting, as a manipulated variable of the transmission output speed governor (9), the theoretical prime mover speed n_mot_nom;

the governor (10) for relief of the prime mover receiving, as a control variable inputs, the speed n_mot of the prime mover (5), an initial transmission theoretical value i_0_nom, and the theoretical prime mover speed n_mot_nom of the prime mover (5), and outputting, as a manipulated variable of the governor (10) for relief of the prime mover, a theoretical transmission ratio i_nom and determining a transmission ratio correction value Δi, with the theoretical transmission ratio i_nom being calculated by adding the correction value Δi to the initial transmission theoretical value i_0_nom; and the initial transmission theoretical value i_0_nom is determined as a function of the theoretical prime mover speed n_mot_nom of the prime mover (5) and the theoretical transmission output speed n_out_nom.

* * * * *